(12) United States Patent
Kokayeff et al.

(10) Patent No.: US 8,283,506 B2
(45) Date of Patent: Oct. 9, 2012

(54) PRODUCTION OF FUEL FROM RENEWABLE FEEDSTOCKS USING A FINISHING REACTOR

(75) Inventors: Peter Kokayeff, Naperville, IL (US); Terry L. Marker, Palos Heights, IL (US); John A. Petri, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 618 days.

(21) Appl. No.: 12/552,590

(22) Filed: Sep. 2, 2009

(65) Prior Publication Data

US 2010/0133144 A1 Jun. 3, 2010

Related U.S. Application Data

(60) Provisional application No. 61/138,265, filed on Dec. 17, 2008.

(51) Int. Cl.
*C07C 1/00* (2006.01)
*C07C 4/00* (2006.01)
(52) U.S. Cl. ......... 585/240; 585/242; 585/702; 585/714
(58) Field of Classification Search .................. 585/240, 585/242, 702, 714; 44/605
See application file for complete search history.

(56) References Cited

U.S. PATENT DOCUMENTS

| 5,186,722 | A | 2/1993 | Cantrell et al. | |
|---|---|---|---|---|
| 5,705,722 | A | 1/1998 | Monnier et al. | |
| 7,232,935 | B2 | 6/2007 | Jakkula et al. | |
| 7,279,018 | B2 | 10/2007 | Jakkula et al. | |
| 7,425,657 | B1 | 9/2008 | Elliott et al. | |
| 7,459,597 | B2 | 12/2008 | Koivusalmi et al. | |
| 7,491,858 | B2 | 2/2009 | Murzin et al. | |
| 7,501,546 | B2 | 3/2009 | Koivusalmi et al. | |
| 7,511,181 | B2 * | 3/2009 | Petri et al. | 585/240 |
| 7,540,952 | B2 | 6/2009 | Pinho et al. | |
| 7,872,165 | B2 * | 1/2011 | Bertoncini et al. | 585/240 |
| 7,888,542 | B2 * | 2/2011 | Koivusalmi et al. | 585/327 |
| 7,977,517 | B2 * | 7/2011 | Cortright et al. | 585/240 |
| 7,982,076 | B2 * | 7/2011 | Marker et al. | 585/240 |
| 8,003,836 | B2 * | 8/2011 | Marker et al. | 585/240 |
| 8,053,615 | B2 * | 11/2011 | Cortright et al. | 585/240 |
| 2006/0186020 | A1 | 8/2006 | Gomes | |
| 2006/0207166 | A1 | 9/2006 | Herskowitz et al. | |
| 2007/0006523 | A1 | 1/2007 | Myllyoja et al. | |
| 2007/0010682 | A1 | 1/2007 | Myllyoja et al. | |
| 2007/0068848 | A1 | 3/2007 | Monnier et al. | |
| 2007/0131579 | A1 | 6/2007 | Koivusalmi et al. | |
| 2007/0135316 | A1 | 6/2007 | Koivusalmi et al. | |

(Continued)

FOREIGN PATENT DOCUMENTS

CN 11270300 A 9/2008

(Continued)

*Primary Examiner* — Nina Bhat
(74) *Attorney, Agent, or Firm* — Maryann Maas

(57) ABSTRACT

A process has been developed for producing fuel from renewable feedstocks such as plant and animal oils and greases. The process involves treating a first portion of a renewable feedstock by hydrogenating and deoxygenating in a first reaction zone and a second portion of a renewable feedstock by hydrogenating and deoxygenating in a second reaction zone and treating the effluents in a finishing reaction zone to provide a diesel boiling point range fuel hydrocarbon product. If desired, the hydrocarbon product can be isomerized to improve cold flow properties. A portion of the hydrocarbon product is recycled to the first reaction zone to increase the hydrogen solubility of the reaction mixture.

19 Claims, 2 Drawing Sheets

U.S. PATENT DOCUMENTS

| | | |
|---|---|---|
| 2007/0135663 A1 | 6/2007 | Aalto et al. |
| 2007/0161832 A1 | 7/2007 | Myllyoja et al. |
| 2007/0170091 A1 | 7/2007 | Monnier et al. |
| 2007/0175795 A1 | 8/2007 | Yao et al. |
| 2007/0260102 A1 | 11/2007 | Duarte Santiago et al. |
| 2007/0281875 A1 | 12/2007 | Scheibel et al. |
| 2007/0287873 A1 | 12/2007 | Coupard et al. |
| 2007/0299291 A1 | 12/2007 | Koivusalmi |
| 2008/0025903 A1 | 1/2008 | Cortright |
| 2008/0033188 A1 | 2/2008 | Dumesic et al. |
| 2008/0045731 A1 | 2/2008 | Zhang |
| 2008/0050792 A1 | 2/2008 | Zmierczak et al. |
| 2008/0052983 A1 | 3/2008 | Aulich et al. |
| 2008/0066374 A1 | 3/2008 | Herskowitz |
| 2008/0092436 A1 | 4/2008 | Seames et al. |
| 2008/0132435 A1 | 6/2008 | Ferreira Fontes et al. |
| 2008/0154073 A1 | 6/2008 | Petri et al. |
| 2008/0156694 A1 | 7/2008 | Chapus et al. |
| 2008/0161614 A1 | 7/2008 | Bertoncini et al. |
| 2008/0161615 A1 | 7/2008 | Chapus et al. |
| 2008/0163543 A1 | 7/2008 | Abhari et al. |
| 2008/0173570 A1 | 7/2008 | Marchand et al. |
| 2008/0216391 A1 | 9/2008 | Cortright et al. |
| 2008/0229654 A1 | 9/2008 | Bradin |
| 2008/0244962 A1 | 10/2008 | Abhari et al. |
| 2008/0281134 A1 | 11/2008 | Ghonasgi et al. |
| 2008/0300434 A1 | 12/2008 | Cortright et al. |
| 2008/0300435 A1 | 12/2008 | Cortright et al. |
| 2008/0302001 A1 | 12/2008 | Koivusalmi et al. |
| 2008/0308457 A1 | 12/2008 | Dindi et al. |
| 2008/0308458 A1 | 12/2008 | Dindi et al. |
| 2008/0312480 A1 | 12/2008 | Dindi et al. |
| 2008/0313955 A1 | 12/2008 | Silva et al. |
| 2009/0014354 A1 | 1/2009 | Knuuttila et al. |
| 2009/0019763 A1 | 1/2009 | Ghonasgi et al. |
| 2009/0029427 A1 | 1/2009 | Miller |
| 2009/0031617 A1 | 2/2009 | O'Rear |
| 2009/0062578 A1 | 3/2009 | Koivusalmi et al. |
| 2009/0069610 A1 | 3/2009 | Roberts, IV et al. |
| 2009/0071872 A1 | 3/2009 | Ginosar et al. |
| 2009/0077866 A1 | 3/2009 | Kalnes et al. |
| 2009/0082606 A1 | 3/2009 | Marker et al. |
| 2009/0084026 A1 | 4/2009 | Miller |
| 2009/0088351 A1 | 4/2009 | Miller |
| 2009/0107033 A1 | 4/2009 | Gudde et al. |
| 2009/0124839 A1 | 5/2009 | Dumesic et al. |
| 2009/0126260 A1 | 5/2009 | Aravanis et al. |
| 2009/0318737 A1 | 12/2009 | Luebke |

FOREIGN PATENT DOCUMENTS

| | | |
|---|---|---|
| CN | 11343552 A | 1/2009 |
| EP | 1719811 A1 | 8/2006 |
| EP | 2046917 | 1/2008 |
| WO | 2007063874 A1 | 6/2007 |
| WO | 2007064015 A1 | 6/2007 |
| WO | 2007064019 A1 | 6/2007 |
| WO | WO 2007/064019 A1 | 6/2007 |
| WO | WO 2007063874 A1 | 6/2007 |
| WO | WO 2007/064015 A1 | 6/2007 |
| WO | 2007125332 A1 | 11/2007 |
| WO | WO 2007/125332 A1 | 11/2007 |
| WO | 2007141293 A1 | 12/2007 |
| WO | WO 2007/141293 A1 | 12/2007 |
| WO | 2008012415 A2 | 1/2008 |
| WO | WO 2008/012415 A2 | 1/2008 |
| WO | 2008020048 A2 | 2/2008 |
| WO | WO 2008/020048 A2 | 2/2008 |
| WO | 2008053284 A1 | 5/2008 |
| WO | WO 2008/053284 A1 | 5/2008 |
| WO | 2008101945 A1 | 8/2008 |
| WO | WO 2008/101945 A1 | 8/2008 |
| WO | 2008105518 A1 | 9/2008 |
| WO | 2008119895 A2 | 9/2008 |
| WO | WO 2008/105518 A1 | 9/2008 |
| WO | WO 2008/119895 A2 | 9/2008 |
| WO | 2008141830 A1 | 11/2008 |
| WO | 2008141831 A1 | 11/2008 |
| WO | WO 2008/141830 A1 | 11/2008 |
| WO | WO 2008/141831 A1 | 11/2008 |
| WO | 2008151792 A1 | 12/2008 |
| WO | 2008152199 A1 | 12/2008 |
| WO | WO 2008/151792 A1 | 12/2008 |
| WO | WO 2008/152199 A1 | 12/2008 |
| WO | 2009004181 A2 | 1/2009 |
| WO | 2009011639 A2 | 1/2009 |
| WO | 2009013233 A2 | 1/2009 |
| WO | WO 2009/004181 A2 | 1/2009 |
| WO | WO 2009/011639 A2 | 1/2009 |
| WO | WO 2009/013233 A2 | 1/2009 |
| WO | 2009020055 A1 | 2/2009 |
| WO | 2009025542 A1 | 2/2009 |
| WO | WO 2009/020055 A1 | 2/2009 |
| WO | WO 2009/025542 A1 | 2/2009 |
| WO | 2009059819 A1 | 5/2009 |
| WO | 2009059920 A2 | 5/2009 |
| WO | WO 2009/059819 A1 | 5/2009 |
| WO | WO 2009/059920 A2 | 5/2009 |

* cited by examiner

PRODUCTION OF FUEL FROM RENEWABLE FEEDSTOCKS USING A FINISHING REACTOR

CROSS-REFERENCE TO RELATED APPLICATION

This application claims priority from Provisional Application Ser. No. 61/138,265 filed Dec. 17, 2008, the contents of which are hereby incorporated by reference in its entirety.

BACKGROUND OF THE INVENTION

This invention relates to a process for producing paraffinic hydrocarbons useful as fuel from renewable feedstocks such as the glycerides and free fatty acids found in materials such as plant oils, fish oils, animal fats, and greases. The process involves hydrogenation, decarboxylation, decarbonylation, and/or hydrodeoxygenation in two or more reaction zones with each reaction zone having an associated feedstock. The reaction zones are operated at from about 80 to about 90 percent conversion of the triglycerides to paraffins. After separation of hydrogen and product gasses, the net liquid and hydrogen are passed to a finishing deoxygenation reactor to reach the desired overall conversion of glycerides to paraffins. Optionally hydroisomerization is conducted in yet an additional reaction zone.

As the demand for fuel such as diesel fuel, gasoline, and aviation fuel increases worldwide there is increasing interest in sources other than petroleum crude oil for producing the fuel. One such source is what has been termed renewable sources. These renewable sources include, but are not limited to, plant oils such as corn, rapeseed, canola, soybean and algal oils, animal fats such as inedible tallow, fish oils and various waste streams such as yellow and brown greases and sewage sludge. The common feature of these sources is that they are composed of glycerides and Free Fatty Acids (FFA). Both of these compounds contain aliphatic carbon chains having from about 8 to about 24 carbon atoms. The aliphatic carbon chains in the glycerides or FFAs can also be mono, di or poly-unsaturated. Some of the glycerides from the renewable sources may be monoglycerides or diglycerides instead of or in addition to the triglycerides.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Applicants have developed a process which comprises an optional pretreatment step, a first reaction zone to hydrogenate, decarboxylate, decarbonylate, and/or hydrodeoxygenate a first portion of the feedstock, a second reaction zone to hydrogenate, decarboxylate, decarbonylate, and/or hydrodeoxygenate a second portion of the feedstock, a separation zone to remove hydrogen and product gases from the combined products of the first and second reaction zones, and then a finishing zone to deoxygenate the net liquid from the separation zone to achieve the desired conversion of the glycerides and FFA to paraffins. The effluent from the finishing zone may be optionally hydroisomerized.

A volume ratio of recycle hydrocarbon to the first portion of the feedstock ranging from about 2:1 to about 8:1 provides a mechanism to increase the hydrogen solubility in the reaction mixture sufficiently so that the operating pressure of the process may be lowered. The range of successful volume ratios of recycle to the first portion of the feedstock is based upon the desired hydrogen solubility in the reaction mixture. There are various points in the process where the recycle stream can originate. The reaction zones may be operated at a pressure in the range of about 1379 kPa absolute (200 psia) to about 4826 kPa absolute (700 psia). Employing two reaction zones and a separate fresh feed stream to each reaction zone followed by a finishing zone allows for both the volume of recycle to be significantly reduced and for suitable catalyst life cycle times to be maintained in the first and second reaction zones.

SUMMARY OF THE INVENTION

A process for producing a hydrocarbon product comprising paraffins from at least a first and a second portion of renewable feedstock is disclosed herein. The process comprises treating the first portion of feedstock in a first reaction zone by hydrogenating and deoxygenating the first portion of feedstock at reaction conditions to provide a first effluent comprising paraffins; passing at least a portion of the first effluent to a second reaction zone and treating the second portion of the feedstock in the second reaction zone by hydrogenating and deoxygenating the second portion of the feedstock at reaction conditions to provide a second effluent comprising paraffins; passing the second effluent comprising paraffins to a separation zone to separate hydrogen and product gases from a liquid phase hydrocarbon, passing the liquid phase hydrocarbon to a finishing reaction zone and hydrotreating and deoxygenating the liquid phase hydrocarbon to generate a finishing reaction zone effluent. The finishing zone is operated at conditions to complete the reactions such as deoxygenation and/or hydroisomerization.

Recycling a portion of the first effluent, the second effluent, the finishing zone effluent or all to the first reaction zone wherein the volume ratio of recycle to the first portion of feedstock is in the range of about 2:1 to about 8:1. The first portion and the second portion of renewable feedstock may be generated by separating a feedstock into two portions, or the first portion and the second portion of renewable feedstock may have different compositions. The first reaction zone and the second reaction zone may be housed in separate vessels, or the first reaction zone and the second reaction zone may be housed in a single vessel.

Hydrogen and product gases are separated from the effluent of the second reaction zone, and the net liquid is passed to a finishing zone. The first and second reaction zones are operated at from about 80 to about 90 percent conversion of the triglycerides to paraffins while the finishing zone operates at 91 percent conversion or greater. The use of the finishing zone provides for achievement of the high overall conversion while operating the first and second reaction zones at low conversion allows for the catalyst life in the first and second reaction zones to be extended.

Optionally, at least a portion of the finishing zone effluent is isomerized by contact with an isomerization catalyst at isomerization conditions to isomerize at least a portion of the paraffins to branched-paraffins.

DETAILED DESCRIPTION OF THE INVENTION

Figure 1:
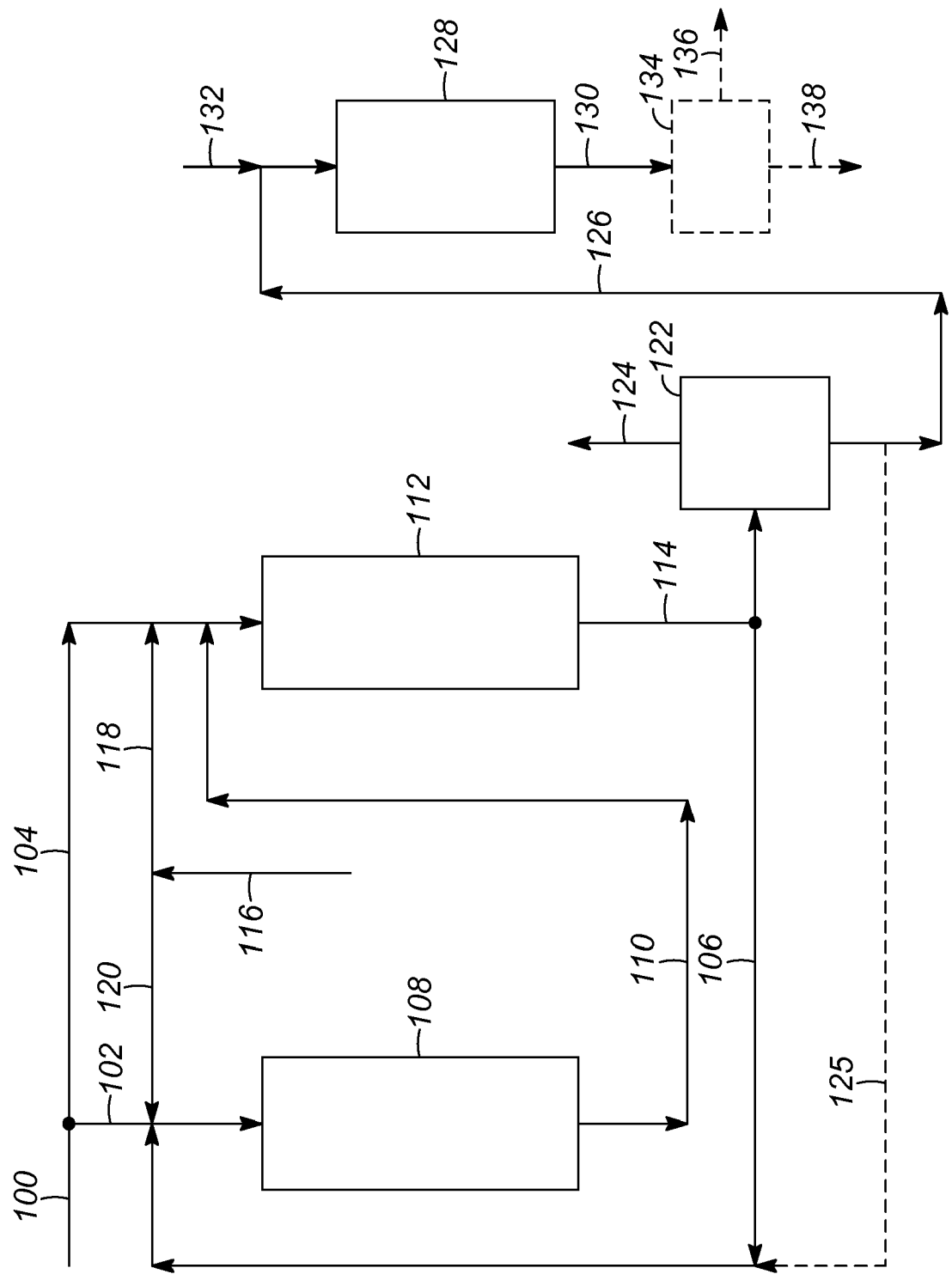
FIG. 1 is a general flow diagram of one embodiment of the invention.

As stated, the present invention relates to a process for producing at least one hydrocarbon product useful as a fuel or a fuel blending component from renewable feedstocks such as those originating from plants or animals. The fuel may be a diesel boiling point range product, an aviation boiling point range product, or a gasoline boiling point range product.

The term renewable feedstock is meant to include feedstocks other than those obtained from petroleum crude oil. Another term that has been used to describe this class of feedstock is biorenewable fats and oils. The renewable feedstocks that can be used in the present invention include any of those which comprise glycerides and free fatty acids (FFA). Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, jatropha oil, inedible tallow, yellow and brown greases, lard, train oil, fats in milk, fish oil, algal oil, sewage sludge, and the like. Additional examples of renewable feedstocks include non-edible vegetable oils from the group comprising *Jatropha curcas* (Ratanjoy, Wild Castor, Jangli Erandi), *Madhuca indica* (Mohuwa), *Pongamia pinnata* (Karanji Honge), and *Azadiracta indicia* (Neem). The glycerides and FFAs of the typical vegetable or animal fat contain aliphatic hydrocarbon chains in their structure which have about 8 to about 24 carbon atoms with a majority of the fats and oils containing high concentrations of fatty acids with 16 and 18 carbon atoms. Mixtures or co-feeds of renewable feedstocks and petroleum-derived hydrocarbons may also be used as the feedstock. Other feedstock components which may be used, especially as a co-feed component in combination with the above listed feedstocks, include spent motor oils and industrial lubricants, used paraffin waxes, liquids derived from the gasification of coal, biomass, natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of what has been considered to be a waste product from a petroleum based or other process into a valuable co-feed component to the current process.

The renewable feedstocks that can be used in the present invention may contain a variety of impurities. For example, tall oil is a byproduct of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow.

Another possible means for removing contaminants is a mild acid wash. This is carried out by contacting the feedstock with an acid such as sulfuric, nitric, phosphoric, or hydrochloric in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in US 2009/0000985 A1, hereby incorporated by reference, is another pretreatment technique which may be employed.

At least two portions of the feedstock are used, one portion of the feedstock is introduced into a first reaction zone, and a second portion of the feedstock is introduced to a second reaction zone. The two portions of the feedstock may be generated by separation of a single feedstock into two portions. Or the two portions of the feedstock may be from independent sources and therefore may have different compositions. The term feedstock is meant to include feedstocks that have not been treated to remove contaminants as well as those feedstocks purified in a pretreatment zone.

The first portion of the feedstock is flowed to a first reaction zone comprising one or more catalyst beds. In the first reaction zone, the first portion of the feedstock is contacted with a hydrogenation or hydrotreating catalyst in the presence of hydrogen at hydrogenation conditions to hydrogenate the olefinic or unsaturated portions of the aliphatic carbon atom chains. Hydrogenation or hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina. Hydrogenation conditions include a temperature of about 200° C. to about 300° C. and a pressure of about 1379 kPa absolute (200 psia) to about 4826 kPa absolute (700 psia). Other operating conditions for the hydrogenation zone are well known in the art.

The hydrogenation and hydrotreating catalysts enumerated above are also capable of catalyzing decarboxylation, decarbonylation, and/or hydrodeoxygenation of the feedstock to remove oxygen. Decarboxylation, decarbonylation, and hydrodeoxygenation are herein collectively referred to as deoxygenation reactions. Deoxygenation conditions generally include a relatively low pressure of about 3447 kPa (500 psia) to about 6895 kPa (1000 psia), a temperature of about 288° C. to about 345° C. and a liquid hourly space velocity of about 1 to about 4 hr$^{-1}$. It is envisioned and is within the scope of this invention that all reactions occur simultaneously in each reaction zone. Alternatively, if multiple beds are employed in each reaction zone, the conditions can be controlled such that hydrogenation primarily occurs in one bed and decarboxylation and/or hydrodeoxygenation occurs in a second bed. Of course if only one bed is used in a reaction zone, then hydrogenation occurs primarily at the front of the bed, while decarboxylation, decarbonylation and hydrodeoxygenation occurs mainly in the middle and bottom of the bed. Finally, desired hydrogenation can be carried out in one reactor, while decarboxylation, decarbonylation, and/or hydrodeoxygenation can be carried out in separate reaction zone.

At least a portion of the effluent from the first reaction zone and the second portion of the feedstock is flowed to a second reaction zone also comprising one or more catalyst beds. In the second reaction zone, the second portion of the feedstock is contacted with a hydrogenation or hydrotreating catalyst in the presence of hydrogen at hydrogenation conditions to hydrogenate the olefinic or unsaturated portions of the aliphatic carbon atom chains. The second reaction zone may be as described above with respect to the first reaction zone. The first and second reaction zones may be housed within the same shell such as in a stacked reactor configurations, or the first and second reaction zones may be housed within two or more shells. Each zone may contain one or more beds of catalysts. The catalysts may be the same or different between the two zones.

Hydrogen is a reactant in the reactions above, and to be effective, a sufficient quantity of hydrogen must be in solution to most effectively take part in the catalytic reaction. Past processes have operated at high pressures in order to achieve a desired amount of hydrogen in solution and readily available for reaction. If hydrogen is not available at the reaction site of the catalyst, the coke forms on the catalyst and deactivates the catalyst. To solve this problem, the pressure is often raised to insure enough hydrogen is available to avoid coking reactions on the catalyst. However, higher pressure operations are more costly to build and to operate as compared to their lower pressure counterparts. One advantage of the present invention is the operating pressure is in the range of about 1379 kPa absolute (200 psia) to about 4826 kPa absolute (700 psia) which is lower than that found in other previous operations. In another embodiment the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, the rate of reaction is increased resulting in a greater amount of throughput of material through the reactor in a given period of time. Lower operating pressures provide an additional advantage in increasing the decarboxylation reaction while reducing the hydrodeoxygenation reaction. The result is a reduction in the amount of hydrogen required to remove oxygen from the feedstock component and produce a finished product. Hydrogen can be a costly component of the feed and reduction of the hydrogen requirements is beneficial from an economic standpoint.

The desired amount of hydrogen is kept in solution at lower pressures by employing a large recycle of hydrocarbon. Other processes have employed hydrocarbon recycle in order to control the temperature in the reaction zones since the reactions are exothermic reactions. However, the range of recycle to feedstock ratios used herein is set based on the need to control the level of hydrogen in the liquid phase and therefore reduce the deactivation rate. The amount of recycle is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the liquid phase in the reaction zone is greatly increased and higher pressures are not needed to increase the amount of hydrogen in solution and avoid catalyst deactivation at low pressures. The hydrocarbon recycle acts as a diluent and a carrier for the hydrogen. In one embodiment of the invention, the volume ratio of hydrocarbon recycle to feedstock is from about 2:1 to about 8:1 or about 2:1 to about 6:1. In another embodiment the ratio is in the range of about 3:1 to about 6:1 and in yet another embodiment the ratio is in the range of about 4:1 to about 5:1.

The ranges of suitable volume ratios of hydrocarbon recycle to feedstock was determined in US 2009/0082606 A1, hereby incorporated by reference, which used a model simulation where the feedstock would be vegetable oil and the recycle would be normal $C_{17}$ and $C_{18}$ paraffins. The results of the simulation showed that the hydrogen solubility increases rapidly until about a recycle to feed ratio of about 2:1. Therefore, the suitable ranges for hydrogen solubility begin at about a recycle to feed ratio of about 2:1. From recycle to feed ratios of about 2:1 through 6:1 the simulation showed that the hydrogen solubility remained high. Thus, the specific ranges of vol/vol ratios of recycle to feed is determined based on achieving a suitable hydrogen solubility in the deoxygenation reaction zone.

When using a single renewable feedstock introduced to the deoxygenation reaction zone, the recycle ratio is calculated with reference to the entire quantity of renewable feedstock being introduced to the deoxygenation zone. Such a large quantity of recycle requires large recycle equipment such as pumps and compressor which can add to the cost of the process. The present process takes advantage of the fact that the product of the deoxygenation reaction is also the diluent or recycle for hydrogen solubility. Therefore, as the reaction progresses, feedstock is converted into diluent resulting in increasing amounts of diluent present in the reaction zone available to maintain the hydrogen solubility. Diluent needs to be provided at the introduction point of the lead reaction zone, but going forward, diluent will be generated as the reactions progress. Therefore, feedstock introduced at reaction zone locations where additional diluent has already been generated by the reactions would not need the introduction of additional recycle of diluent. Only feedstock at the lead introduction point needs the recycle stream, later introduction points do not need a recycle stream. Furthermore, the recycle to feed ratio is based upon the quantity of feedstock at the lead introduction point, and not on the whole cumulative quantity of feedstock introduced at all locations. By introducing the renewable feedstock to the deoxygenation reaction zone in two or more portions at different locations in the deoxygenation reaction zone, and providing recycle to the lead location with the recycle to feed ratio based on the quantity of feedstock introduced at the lead location, the total volume of recycle stream is significantly reduced. Reduced recycle stream results in smaller recycle pumps, a smaller recycle condenser, and possibly smaller heat exchangers or heaters.

Accordingly and as described above, the deoxygenation reaction zone comprises at least a first reaction zone and a second reaction zone. The renewable feedstock is divided into a first portion and a second portion, or two independent renewable feedstocks are used as the first portion and the second portion. The first portion of the renewable feedstock is introduced to the first reaction zone and the second portion of the renewable feedstock is introduced to the second reaction zone. The first and second portions of the renewable feedstock may have the same or different compositions. The relative volumes of the first portion of the renewable feedstock and the second portion of the renewable feedstock ranges from about 40/60 to about 60/40. In one embodiment the relative volume of the first portion of the renewable feedstock introduced to the first reaction zone and the second portion of the renewable feedstock introduced to the second reaction zone is 45/55.

The first and the second reaction zones are operated at conditions only severe enough to achieve from about 80 to about 90 wt. % conversion of triglycerides in the feedstock to paraffins. Lowering the severity of the operating conditions, allows for the catalyst to maintain the required level of activity for a longer period of time. The catalyst cycle time is longer in the first and second reaction zones for the same volume of catalyst or the catalyst volume is lower for the same cycle time of catalyst, both of which are more cost effective for an operator.

Hydrogen and product gases are separated from the effluent of the second reaction zone in a separation zone. The separation zone may contain any type of separation device such as a separator or a stripper. The hydrogen from the separation zone may be recycled to the first and the second reaction zones. The net liquid from the separation zone, along with hydrogen, are conducted to a finishing zone. The finishing zone contains a catalyst for finishing deoxygenation reactions as described above for the first and second reaction zones. The catalyst may be any of those described above as suitable for the first and second reaction zones. The catalyst may be the same or may be different from those employed in the first and second reaction zones. It is likely that the size and amount of catalyst in the finishing zone will be less than either the first reaction zone or the second reaction zone. The finishing zone is operated at conditions so that the desired overall 91 percent or greater conversion of the triglycerides in the feedstocks to paraffins is achieved. In another embodiment, the finishing zone may additionally or alternatively contain a catalyst for performing hydroisomerization of n-paraffins produced from the deoxygenation reactions.

Turning to FIG. 1, renewable feedstock 100 is divided into two equal portions, a first portion 102 and a second portion 104. The first portion 102 is combined with hydrocarbon recycle 106 and introduced into first reaction zone 108 where it contacts a hydrogenation and deoxygenation catalyst and undergoes hydrogenation and deoxygenation to generate first reaction zone effluent 110. Reaction zone 108 is operated to achieve from about 80 to about 90 wt. % conversion of triglycerides to paraffins. Effluent 110 comprises at least paraffins and is combined with second portion 104 of the renewable feedstock. The combined feed is introduced to second reaction zone 112 which contains a hydrogenation and deoxygenation catalyst. The second portion of the renewable feedstock is hydrogenation and deoxygenated to form paraffins in second reaction zone effluent 114. Reaction zone 112 is operated to achieve from about 80 to about 90 wt. % conversion of triglycerides to paraffins. A portion of second reaction zone effluent 114 is separated into recycle stream 106 and combined with the first portion 102 of the renewable feedstock. In another embodiment, a portion of the net liquid in line 126 is removed in line 125 and recycled to combine with the first portion 102 of the renewable feedstock. Net liquid in line 125 may be used in addition to or in replacement of line 106. Gas containing hydrogen in line 116 from the compressor is divided into two streams, 118 and 120. Gas portion 120 is directed to the first reaction zone and gas portion 118 is directed to the second reaction zone. The second reaction zone effluent 114 is conducted to separator 122 where hydrogen and product gases are removed in stream 124. The net liquid is removed in line 126 and routed, along with optional hydrogen if required in stream 132 to finishing reactor 128 where it contacts a hydrogenation and deoxygenation catalyst to achieve the total net conversion of the triglycerides to paraffins of 91 percent conversation or greater. Product stream 130 may be collected, or may be optionally isomerized to increase the concentration of branched paraffins.

In another embodiment, a portion of product stream 130 may be recycled to first reaction zone 108 and/or second reaction zone 112. This embodiment is most beneficial when the rate of hydrogen stream 132 satisfies or exceeds the chemical hydrogen requirement of finishing reactor 128. When the hydrogen stream 132 exceeds the chemical hydrogen requirement of finishing reactor 128, product stream 130 contains soluble hydrogen in the liquid phase. In this same embodiment, hydrogen stream 132 and gas containing hydrogen stream 116 would be would be equipped with a compressor. The flows of streams 132 and 116 are determined by the chemical hydrogen requirements of finishing reactor 128, first reaction zone 108, and second reaction zone 112. Finishing reactor 128 may be operated at a higher pressure than first reaction zone 108 or second reaction zone 112, or both.

In yet another embodiment, stream 132 may provide the chemical hydrogen requirements for finishing reactor 128, as well as the chemical hydrogen requirements for first reaction zone 108 and second reaction zone 112. Product stream 130 may be flashed in optional separator 134. Net gasses formed in finishing reactor 128 are removed from optional separator 134 in optional line 136. Optional line 136 is in fluid communication with stream 116 (not shown) and no compressor would be needed on stream 116. Therefore, in this embodiment, only one stream, stream 132, is equipped with a compressor. A portion of optional liquid stream 138 could be recycled to first reaction zone 108 or second reaction zone 112.

Providing the feed in at least two portions to at least two reaction zones allows for the quantity of recycle to be reduced, without losing the hydrogen solubility benefits of the recycle. Also, as the feed is deoxygenated in the first reaction zone, hydrocarbons are generated thereby maintaining or even increasing the hydrogen solubility as the effluent from the first reaction zone and the second portion of feed are added to the second reaction zone. Operating the first and second reaction zones at conditions to achieve from about 80 to about 90 wt. % conversion of triglycerides to paraffins allows the catalyst life in those zones to increase with respect to the same catalyst volume, or the catalyst volume may be decreased while maintaining a fixed catalyst life.

The reaction product from the deoxygenation reactions in the deoxygenation zones will comprise a liquid portion and a gaseous portion. The liquid portion comprises a hydrocarbon fraction which is essentially all n-paraffins. A portion of this liquid hydrocarbon fraction, after separation, may be used as the hydrocarbon recycle described above.

Although this hydrocarbon fraction is useful as a diesel fuel or fuel blending component, because it comprises largely n-paraffins, it will have poor cold flow properties. To improve the cold flow properties of the liquid hydrocarbon fraction, the reaction product may be contacted with an isomerization catalyst in the presence of hydrogen under isomerization conditions to at least partially isomerize the normal paraffins to branched paraffins. In one embodiment, the normal paraffins are completely or nearly completely isomerized to branched paraffins. Catalysts and conditions for isomerization are well known in the art. See for example US 2004/0230085 A1 which is incorporated by reference in its entirety. Isomerization can be carried out in a separate bed of the same reaction zone, i.e. same reactor, described above or the isomerization can be carried out in a separate reactor. In some applications, only minimal branching is required, enough to overcome cold-flow problems of the normal paraffins.

The isomerization of the paraffinic product can be accomplished in any manner known in the art or by using any suitable catalyst known in the art. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. Nos. 4,795,623 and 4,924,027. Further catalysts and conditions for skeletal isomerization are disclosed in U.S. Pat. Nos. 5,510,306, 5,082,956, and 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. Nos. 4,310,440; 4,440,871; 4,793,984; 4,758,419; 4,943,424; 5,087,347; 5,158,665; 5,208,005; 5,246,566; 5,716,897; and 5,851,949 are hereby incorporated by reference.

U.S. Pat. Nos. 5,444,032 and 5,608,132 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. Nos. 5,981,134 and 5,908,344 teach a suitable bifunctional catalyst which comprises: (a) a porous crystalline material isostructural with beta-zeolite selected from boro-silicate (BOR-B) and boro-alumino-silicate (Al-BOR-B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization catalyst may be any of those well known in the art such as those described and cited above. Isomerization conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia). Other operating conditions for the isomerization zone are well known in the art.

Whether isomerization is carried out or not, the final effluent stream, i.e. the stream obtained after all reactions have been carried out, is now processed through one or more separation steps to obtain a purified hydrocarbon stream useful as a diesel fuel or a fuel blending component. Some cracking may occur and an aviation boiling point range fuel may be generated as well as a diesel boiling point range fuel. Additionally, lighter material may be generated which is in the gasoline boiling point range and used as a blending component in gasoline.

Because the final effluent stream comprises both a liquid and a gaseous component, the liquid and gaseous components are separated using a separator such as a cold separator. The separated liquid component comprises the product hydrocarbon stream useful as a diesel fuel, or fuel blending component. Further separations may be performed to remove naphtha and LPG from the product hydrocarbon stream. The separated gaseous component comprises mostly hydrogen and the carbon dioxide from the decarboxylation reaction. The carbon dioxide can be removed from the hydrogen by means well known in the art, reaction with a hot carbonate solution, pressure swing absorption, etc. Also, absorption with an amine in processes such as described in US 2009/0082603 A1 and US 2009/0077868 A1, incorporated by reference, may be employed. If desired, essentially pure carbon dioxide can be recovered by regenerating the spent absorption media. The hydrogen remaining after the removal of the carbon dioxide may be recycled to the reaction zone where hydrogenation primarily occurs and/or to any subsequent beds/reactors. It is also envisioned that hydrogen separated from the finishing reactor effluent may be recycled to the first or second deoxygenation zones possibly without the use of a compressor, especially when the finishing reactor is operated at a higher pressure than the first or second deoxygenation zones.

Finally, a portion of the product hydrocarbon is recycled to the first hydrogenating and deoxygenating reaction zone. The recycle stream may be taken from the product hydrocarbon stream after the hydrogenating and deoxygenating reaction zones and after separation from gaseous components, and recycled back to the first hydrogenating and deoxygenating reaction zone. Or the recycle stream may be taken from the effluent of a separation unit, such as a hot high pressure separator, located between the deoxygenation reaction zone and the isomerization reaction zone. The recycle stream may also be taken from the isomerized product. A portion of a hydrocarbon stream from, for example, a hot high pressure separator or a cold high pressure separator, may also be cooled down if necessary and used as cool quench liquid between the beds of the deoxygenation reaction zone to further control the temperature rise from the heat of reaction and provide quench liquid for emergencies. The bulk of the recycle stream is introduced to the inlet of the first deoxygenation reaction zone. If any recycle is introduced to any subsequent reaction zone, the amount of recycle may be limited to the amount of quench needed. One benefit of the hydrocarbon recycle is to control the temperature rise across the individual beds. However, as discussed above, the amount of hydrocarbon recycle to the first hydrogenation and deoxygenation reaction zone herein is determined based upon the desired hydrogen solubility in the reaction zones. Increasing the hydrogen solubility in the reaction mixture allows for successful operation at lower pressures, and thus reduced cost. Operating with sufficient recycle and maintaining high levels of hydrogen in the liquid phase helps dissipate hot spots at the catalyst surface and reduces the formation of undesirable heavy components which lead to coking and catalyst deactivation.

Figure 2:
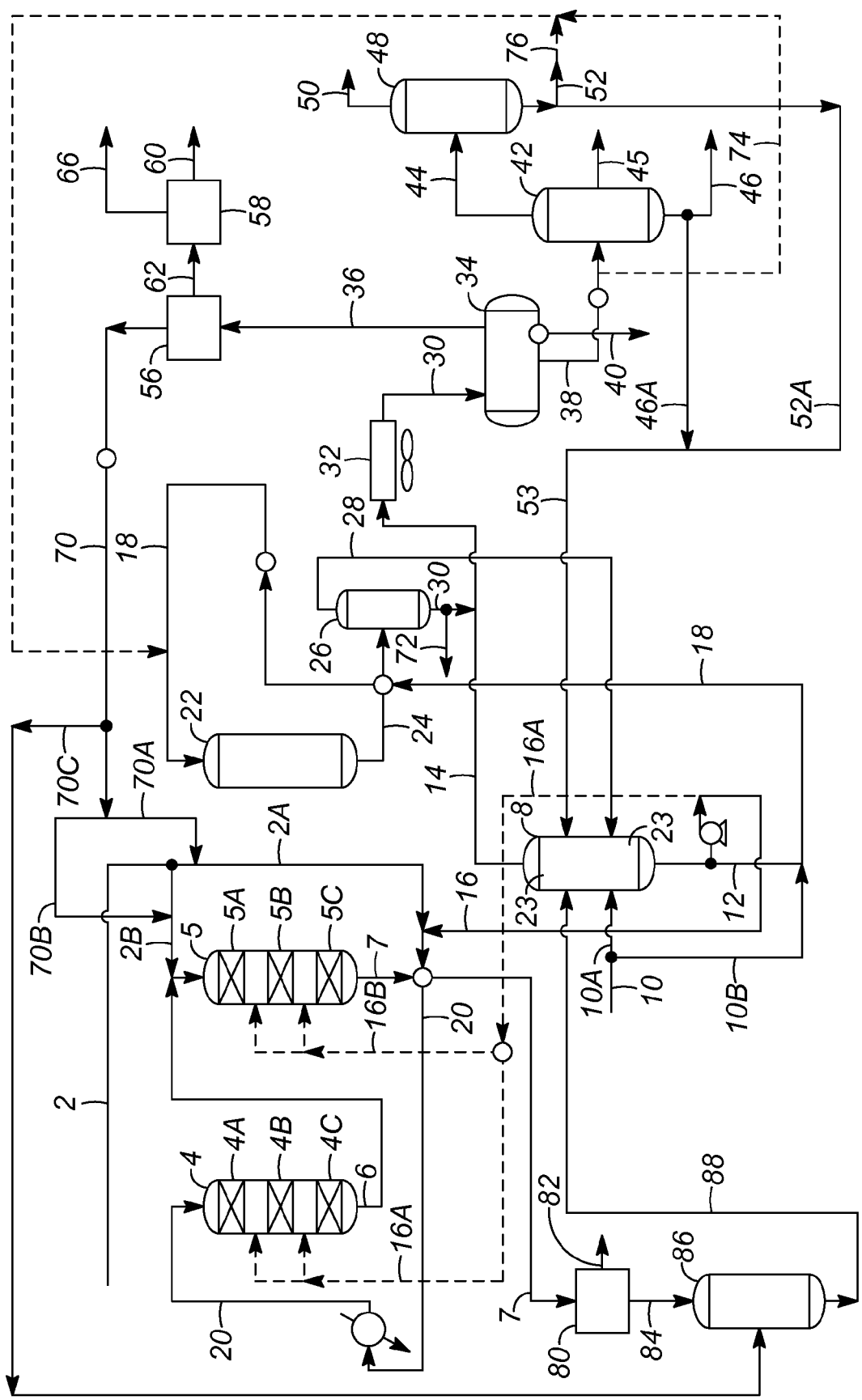
FIG. 2 is a more detailed flow diagram of one embodiment of the invention which includes the optional isomerization zone.

FIG. 2 shows a more detailed embodiment of the invention including an isomerization zone and multiple separation zones. Turning to FIG. 2, the process begins with a renewable feedstock stream 2 which is divided 45/55 into two portions, a first portion 2a and a second portion 2b. The first portion 2a of feedstock stream is combined with recycle stream 16, and at least a portion of recycle gas stream 70a to form combined feed stream 20, which is heat exchanged with reactor effluent and then introduced into first deoxygenation reactor 4. The ratio of recycle to first portion 2a of feed may range from about 2:1 to about 6:1. The heat exchange may occur before or after the recycle is combined with the first portion 2a of the feed. First deoxygenation reactor 4 may contain multiple beds shown in FIG. 2 as 4a, 4b and 4c. First deoxygenation reactor 4 contains at least one catalyst capable of catalyzing hydrogenation and deoxygenation of the feedstock to saturate and remove oxygen. First deoxygenation reactor effluent stream 6 containing the products of the hydrogenation and deoxygenation reactions is removed from first deoxygenation reactor 4, is combined with second portion 2b of the feed stream 2, and optionally combined with a second portion of recycle gas 70b and introduced to second deoxygenation reactor 5. Recycle gas 70 may be divided into two or more portions, 70a, 70b and 70c, with each portion being directed to a different reaction zone as shown in FIG. 2, or recycle gas 70 may be directed to only one reaction zone such as the first or the second reaction zone. Second deoxygenation reactor 5 may contain multiple beds shown as 5a, 5b and 5c. Second deoxygenation reactor 5 contains at least one catalyst capable of catalyzing hydrogenation and deoxygenation of the feedstock to saturate and remove oxygen. Second deoxygenation reactor effluent stream 7 containing the products of the deoxygenation and hydrogenation reactions and is removed from second deoxygenation reactor 5 and heat exchanged with stream 20 containing first portion 2a of feed 2 to the first deoxygenation reactor 4. Stream 7 comprises a liquid component containing largely normal paraffin hydrocarbons in the diesel boiling point range and a gaseous component containing largely hydrogen, vaporous water, carbon monoxide, carbon dioxide and propane. First and second deoxygenation reactors are operated at conditions to achieve about 80 to about 90 percent conversion of the triglycerides to paraffins.

Second deoxygenation reactor effluent stream 7 is cooled (not shown) and directed to separator 80. Some hydrogen and product gases are removed from separator 80 in line 82, while the net liquid comprising hydrocarbons such as paraffins is removed from separator 80 in line 84. The net liquid in line 84 is introduced into finishing deoxygenation reactor 86 which contains a hydrogenation and deoxygenation catalyst. Finishing deoxygenation reactor 86 is operated at conditions to achieve 91 wt. percent or greater, such as 99 wt. percent conversion of triglycerides to paraffins. If necessary, a portion of the hydrogen in line 70c, from the recycle gas compressor, may be introduced into finishing deoxygenation reactor 86 to supply the chemical requirements for hydrogen in finishing reactor 86. The effluent 88 of finishing deoxygenation reactor 86 is routed to a hot high pressure hydrogen stripper 8.

Make up hydrogen in line 10 is divided into two portions, stream 10a and 10b. Make up hydrogen in stream 10a is also introduced to hot high pressure hydrogen stripper 8. Note that in other embodiments, the make up hydrogen may be introduced at other locations of the process. In hot high pressure hydrogen stripper 8, the gaseous component of finishing reactor effluent 88 is selectively stripped from the liquid component of finishing reactor effluent 88 using make-up hydrogen 10a and recycle hydrogen 28. The dissolved gaseous component comprising hydrogen, vaporous water, carbon monoxide, carbon dioxide and at least a portion of the propane, is selectively separated into hot high pressure hydrogen stripper overhead stream 14. The remaining liquid component of finishing reactor effluent 88 comprises primarily normal paraffins having a carbon number from about 8 to about 24 is removed as hot high pressure hydrogen stripper bottom 12.

A portion of hot high pressure hydrogen stripper bottoms forms recycle stream 16 and is combined with first portion 2a of renewable feedstock stream 2 to create combined feed 20. Other portions of recycle stream 16, optional streams 16a and 16b, may be routed directly to deoxygenation reactors 4 and 5 and introduced at interstage locations such as between beds 4a and 4b and or between beds 4b and 4c, between beds 5a and 5b and or between beds 5b and 5c in order, for example, to aid in temperature control. The remainder of hot high pressure hydrogen stripper bottoms in stream 12 is combined with hydrogen stream 10b to form combined stream 18 which is routed to isomerization and selective hydrocracking reactor 22. The make up hydrogen stream 10b and hot high pressure stripper bottoms 12 from a recycle oil pump may allow isomerization and selective hydrocracking reactor 22 to operate at a higher pressure then hot high pressure hydrogen stripper 8 and air cooler 32. Then, liquid from hydrogen separator 26 in bottom stream 30 does not need a pump to flow to air cooler 32 and overhead stream 28 does not require a compressor to flow to hot high pressure hydrogen stripper 8. Stream 18 may be heat exchanged with isomerization reactor effluent 24.

The product of the isomerization reactor containing a gaseous portion of hydrogen and propane and a branched-paraffin-enriched liquid portion is removed in line 24, and after optional heat exchange with stream 18, is introduced into hydrogen separator 26. The overhead stream 28 from hydrogen separator 26 contains primarily hydrogen which may be recycled back to hot high pressure hydrogen stripper 8. Bottom stream 30 from hydrogen separator 26 is air cooled using air cooler 32 and introduced into product separator 34. In product separator 34 the gaseous portion of the stream comprising hydrogen, carbon monoxide, hydrogen sulfide, carbon dioxide and propane are removed in stream 36 while the liquid hydrocarbon portion of the stream is removed in stream 38. A water byproduct stream 40 may also be removed from product separator 34. Stream 38 is introduced to product stripper 42 where components having higher relative volatilities are separated into stream 44, components within the boiling range of aviation fuel is removed in stream 45, with the remainder, the diesel boiling point range components, being withdrawn from product stripper 42 in line 46. Optionally, a portion of the diesel boiling point range components in line 46 are recycled in line 46a to hot high pressure hydrogen stripper 8 optional rectification zone 23 and used as an additional rectification agent. Stream 44 is introduced into fractionator 48 which operates to separate LPG into overhead 50 leaving a naphtha bottoms 52. Naphtha bottoms 52 may be used as a gasoline blending component. A portion of naphtha bottoms 52 in line 52a may be optionally used as rectification agent stream 53 which is optionally recycled to hot high pressure hydrogen stripper 8 optional rectification zone 23 and used as a rectification agent. Both a portion of stream 52 and a portion of stream 46 may be used as the optional rectification agent. Any of optional lines 72, 74, or 76 may be used to recycle at least a portion of the isomerization zone effluent back to the isomerization zone to increase the amount of n-paraffins that are isomerized to branched paraffins. It is further envisioned that aviation boiling point range components may also be separated in product stripper 42 and removed.

The vapor stream 36 from product separator 34 contains the gaseous portion of the isomerization effluent which comprises at least hydrogen, carbon monoxide, hydrogen sulfide, carbon dioxide and propane and is directed to a system of amine absorbers to separate carbon dioxide and hydrogen sulfide from the vapor stream. Because of the cost of hydrogen, it is desirable to recycle the hydrogen to deoxygenation reactor 4, but it is not desirable to circulate the carbon dioxide or an excess of sulfur containing components. In order to separate sulfur containing components and carbon dioxide from the hydrogen, vapor stream 36 is passed through a system of at least two amine absorbers, also called scrubbers, starting with the first amine absorber zone 56. The amine chosen to be employed in first amine scrubber 56 is capable of selectively removing at least both the components of interest, carbon dioxide and the sulfur components such as hydrogen sulfide. Suitable amines are available from DOW and from BASF, and in one embodiment the amines are a promoted or activated methyldiethanolamine (MDEA). See U.S. Pat. No. 6,337,059, hereby incorporated by reference in its entirety. Suitable amines for the first amine absorber zone from DOW include the UCARSOL™ AP series solvents such as AP802, AP804, AP806, AP810 and AP814. The carbon dioxide and hydrogen sulfide are absorbed by the amine while the hydrogen passes through first amine scrubber zone and into line 70 to be recycled to the first reaction zone and optionally the second reaction zone. The amine is regenerated and the carbon dioxide and hydrogen sulfide are released and removed in line 62. Within the first amine absorber zone, regenerated amine may be recycled for use again. The released carbon dioxide and hydrogen sulfide in line 62 are passed through second amine scrubber zone 58 which contains an amine selective to hydrogen sulfide, but not selective to carbon dioxide. Again, suitable amines are available from DOW and from BASF, and in one embodiment the amines are a promoted or activated MDEA. Suitable amines for the second amine absorber zone from DOW include the UCARSOL™ HS series solvents such as HS101, HS 102, HS103, HS104, HS115. Therefore the carbon dioxide passes through second amine scrubber zone 58 and into line 66. The amine may be regenerated which releases the hydrogen sulfide into line 60. Regenerated amine is then reused, and the hydrogen sulfide may be recycled to the deoxygenation reaction zone. Conditions for the first scrubber zone includes a temperature in the range of 30 to 60° C. The first absorber is operated at essentially the same pressure as the reaction zone. By "essentially" it is meant that the operating pressure of the first absorber is within about 1034 kPa absolute (150 psia) of the operating pressure of the reaction zone. For example, the pressure of the first absorber is no more than 1034 kPa absolute (150 psia) less than that of the reaction zone. The second amine absorber zone is operated in a pressure range of from 138 kPa absolute (20 psia) to 241 kPa absolute (35 psia). Also, at least the first the absorber is operated at a temperature that is at least 1° C. higher than that of the separator. Keeping the absorbers warmer than the separator operates to maintain any light hydrocarbons in the vapor phase and prevents the light hydrocarbons from condensing into the absorber solvent.

What is claimed is:

1. A process for producing a hydrocarbon product comprising paraffins from at least a first and a second portion of renewable feedstock said process comprising;
   a) treating the first portion of renewable feedstock in a first reaction zone by hydrogenating and deoxygenating the first portion of feedstock at reaction conditions to provide a first effluent comprising paraffins;
   b) passing at least a portion of the first effluent to a second reaction zone and treating the second portion of renewable feedstock in the second reaction zone by hydrogenating and deoxygenating the second portion of renewable feedstock at reaction conditions to provide a second effluent comprising paraffins;
   c) passing the second effluent comprising paraffins to a separation zone to separate a gaseous phase from a liquid phase;
   d) passing the liquid phase to a finishing reaction zone and treating the liquid phase by hydrogenating and deoxygenating the liquid phase at reaction conditions to provide a finishing reaction zone effluent, wherein the temperature or pressure or both are higher in the finishing reaction zone than in either the first or the second reaction zones; and
   e) recycling a recycle stream comprising a portion of at least one of the reaction zone effluents or a portion of the finishing reaction zone effluent to the first reaction zone wherein the volume ratio of recycle stream to first portion of renewable feedstock is in the range of about 2:1 to about 8:1.

2. The process of claim 1 wherein the first portion and the second portion of renewable feedstock are generated by separating a feedstock into two portions.

3. The process of claim 1 wherein the first portion and the second portion of renewable feedstock have different compositions.

4. The process of claim 1 wherein the first reaction zone and the second reaction zone are housed in separate vessels.

5. The process of claim 1 wherein the first reaction zone and the second reaction zone are housed in a single vessel.

6. The process of claim 1 wherein the recycle stream comprises both a portion of the first effluent and a portion the second effluent.

7. The process of claim 1 wherein the recycle stream comprises a portion of the first effluent, a portion the second effluent, and a portion of the finishing reaction zone effluent.

8. The process of claim 1 further comprising isomerizing at least a portion of the paraffins in the finishing reaction zone effluent by contacting the finishing reaction zone effluent with an isomerization catalyst at isomerization conditions to isomerize at least a portion of the paraffins to branched-paraffins.

9. The process of claim 1 further comprising separating the finishing reaction zone effluent into a gas phase stream and a liquid phase stream and isomerizing at least a portion of the liquid phase stream by contacting the liquid phase stream with an isomerization catalyst at isomerization conditions to isomerize at least a portion of the paraffins to branched-paraffins.

10. The process of claim 1 where the first reaction zone comprises a hydrogenation and deoxygenation catalyst at a temperature of about 200° C. to about 300° C. and a pressure of about 1379 kPa absolute (200 psia) to about 4826 kPa absolute (700 psia) where the second reaction zone comprises a hydrogenation and deoxygenation catalyst at a temperature of about 200° C. to about 300° C. and a pressure of about 1379 kPa absolute (200 psia) to about 4826 kPa absolute (700 psia); and the finishing reaction zone comprises a hydrogenation and deoxygenation catalyst at a temperature of about greater than 200° C. to about 400° C. and a pressure of about greater than 1379 kPa absolute (200 psia) to about 4826 kPa absolute (700 psia).

11. The process of claim 1 further comprising treating a petroleum hydrocarbon feedstock in the first reaction zone or the second reaction zone.

12. The process of claim 1 wherein the first portion or the second portion of the feedstock comprises at least one component selected from the group consisting of canola oil, corn oil, soy oil, rapeseed oil, soybean oil, colza oil, tall oil, sunflower oil, hempseed oil, olive oil, linseed oil, coconut oil, jatropha oil, castor oil, peanut oil, palm oil, mustard oil, cottonseed oil, tallow, greases, lard, train oil, fats in milk, fish oil, algal oil, sewage sludge, pyrolysis oil, oxygenated liquids derived from the gasification of coal, oxygenated liquids derived from depolymerization, synthetic oils, and mixtures thereof.

13. The process of claim 1 further comprising blending a portion of the finishing reaction zone product with petroleum derived hydrocarbons to generate a fuel.

14. The process of claim 1 further comprising selectively separating, in a separation zone, at least a portion of the finishing reactor effluent into a diesel product stream comprising a first portion of the paraffins having boiling points in the diesel boiling point range and at least one overhead stream comprising at least LPG and naphtha.

15. The process of claim 14 wherein the selectively separating further provides an aviation product stream comprising paraffins having boiling points in the aviation boiling point range.

16. The process of claim 14 wherein the selectively separating further provides an aviation product stream comprising paraffins having boiling points in the aviation boiling point range.

17. The process of claim 14 wherein the separation zone comprises two or more fractionation columns.

18. The process of claim 14 wherein the separation zone comprises a single fractionation column.

19. The process of claim 14 wherein the separation zone comprises a hot flash drum and at least one fractionation column.

* * * * *